United States Patent [19]

Poncy

[11] Patent Number: 5,007,592
[45] Date of Patent: Apr. 16, 1991

[54] DISPOSABLE PEPPERMILL

[76] Inventor: George W. Poncy, 3725 Investment La., Riviera Beach, Fla. 33404

[21] Appl. No.: 38,648

[22] Filed: Apr. 15, 1987

[51] Int. Cl.$^5$ .............................................. B02C 42/04
[52] U.S. Cl. ............................... 241/169.1; 241/285 R
[58] Field of Search ................ 241/168, 169.1, 257 R, 241/258, 261.1, 285 R, DIG. 27, 169; 222/142.1–142.9; D7/52, 53, 68, 58

[56] References Cited

U.S. PATENT DOCUMENTS

| | | | |
|---|---|---|---|
| 274,255 | 3/1883 | Barr | 241/169.1 |
| 2,479,151 | 8/1949 | Bostick | 241/258 X |
| 2,876,956 | 3/1959 | Bentley | 241/168 |
| 3,578,253 | 5/1971 | Brilliant | 241/169.1 |

FOREIGN PATENT DOCUMENTS

| | | |
|---|---|---|
| 14658 | 12/1880 | Fed. Rep. of Germany . |
| 2222865 | 11/1973 | Fed. Rep. of Germany ... 241/169.1 |
| 2852398 | 6/1979 | Fed. Rep. of Germany . |
| 1409224 | 7/1965 | France . |

OTHER PUBLICATIONS

Prior Art Affidavit, 12/10/87.

*Primary Examiner*—Mark Rosenbaum
*Attorney, Agent, or Firm*—Lane, Aitken & McCann

[57] ABSTRACT

In a peppermill, which is designed as a disposable container for contained peppercorns, a cylindrical body is provided with a grooved section at one end to comprise the female element of the grinding mechanism. The grooved section includes a conical inwardly directed fact which mates with a conical surface on a male grinding element which closes one end of the cylinder. The other end of the cylinder is closed by a turning knob, which is rotatably mounted on the cylinder. A connecting rod is molded in one piece with the turning knob and is permanently connected to the male grinding element so that the peppermill cannot be refilled.

4 Claims, 2 Drawing Sheets

DISPOSABLE PEPPERMILL

This invention relates to a peppermill and, more particularly, to a peppermill which is sufficiently inexpensive to make the grinder serve as a disposable container for the peppercorns.

BACKGROUND OF THE INVENTION

In present day peppermills, the grinder mechanism comprises a tapered male grooved element which coacts with a grooved female element. The rotation of the male element in the female element forces he peppercorns between the two elements to crush the peppercorns and dispense the crushed particles. The female element is mounted in the bottom floor of a body which serves to contain the peppercorns prior to being ground. A rod connects the male element of the grinding mechanism to an external actuating knob by which the rod and male element can be turned in the female element. Additional hardware is required to hold the female element in the grinder body as well as hold the male element in place with respect to the female element. Typically, nine different parts are required to be assembled together into a complete peppermill.

SUMMARY OF THE INVENTION

The present invention greatly simplifies the peppermill structure so that only three parts are required for assembly. The peppermill can be made for about the same cost as an ordinary container in which the peppercorns are normally sold and can be thrown away after using up all the contained peppercorns. In accordance with the invention, the peppermill body is in the form of a hollow cylinder, which is provided with an inwardly facing conical face at one end. Grooves are inscribed on the conical face and on a cylindrical section adjacent to the conical face to define the female element of the grinder mechanism. The male element of the grinder mechanism, has grooves defined thereon and has a conical portion to conform in shape to the conical face of the female element of the grinding mechanism. A connecting rod connects a turning knob with the male element of the grinding mechanism. The rod is molded in one piece with either the turning knob or male grinding element. The male element, rod, and turning knob are fixed permanently together to complete the assembled peppermill filled with the peppercorns to be dispensed.

In the preferred embodiment the connecting rod is molded in one piece with the turning knob. In this embodiment the assembled body and turning knob are filled with peppercorns, which surround the connecting rod, and then the connecting rod is affixed to the male grinding element. Alternatively, the connecting rod may be molded in one piece with the male element of the grinding mechanism. In this embodiment, the body is assembled with the male grinding element and then filled with peppercorns. The knob is then affixed to the other end of the connecting rod to complete the assembly of the structure.

The simplified, low-cost construction is achieved because (1) the same piece is used to form the peppermill body as well as define the female portion of the grinding mechanism and (2) the connecting rod is molded in one piece with either the turning knob or the male element of the grinding mechanism.

Another advantage of the peppermill of the present invention over the prior art grinders is that it more effectively grinds the remaining peppercorns as the supply of peppercorns contained in the peppermill becomes exhausted. In a conventional peppermill, the grinding surfaces are normally located radially inward from the limit of the containment of the peppercorns at the bottom end of the grinder. As a result, when only a few of the peppercorns remain in the peppermill and when the peppermill is naturally tilted during the grinding operation, the peppercorns are rolled away from the entrance to the grinding surfaces and they are not ground. In the peppermill of the present invention, because the female grinding element is formed on the wall of the cylindrical body containing the peppercorns, the entrance to the grinding surfaces is at the boundary of the containment of the peppercorns. As a result, when the peppermill is tilted during grinding operation and the peppercorns are reduced to the last few remaining in the peppermill, the tilting action rolls these last few peppercorns directly to the entrance to the grinding surfaces, and thus, the peppermill grinds the peppercorns effectively down to the last contained peppercorn.

Accordingly, an object of the present invention is to provide an inexpensive pepper grinder.

A further object of the present invention is to provide a peppermill which is sufficiently inexpensive to make it disposable after the peppercorns contained in the peppermill are dispensed from the grinder.

A further object of the present invention is to provide a peppermill which will more efficiently grind the remaining peppercorns in the peppermill as the peppercorns become exhausted.

Further objects and advantages of the present invention will become readily apparent as the following detailed description of the invention unfolds and when taken in conjunction with the drawings.

DESCRIPTION OF THE PREFERRED EMBODIMENTS

Figure 1:
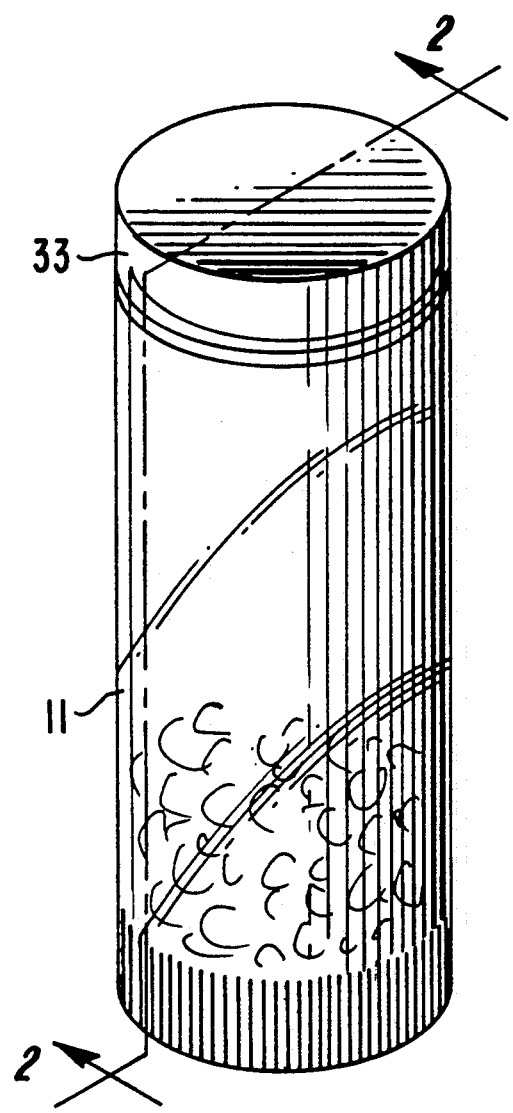
FIG. 1 is a perspective view of the assembled peppermill of the present invention containing peppercorns to be ground.

The preferred embodiment of the peppermill of the invention, as shown in FIG. 1-6 comprises a hollow cylindrical body 11, which has one end face 13 formed into a conical inwardly facing taper at an angle of about 30 degrees to the axis of the body 11. The body 11 is preferably made of hard transparent synthetic resin. The conical end face 13 and a section 14 of the inside wall of the cylindrical body 11 adjacent to the tapered end face 13 are grooved with vertical grooves, which are distributed at 5 degree intervals about the axis of the body 11. The grooves are 0.040 inches deep and in width. The grooved conical end face and the adjacent grooved section 14 of the inside cylindrical wall form the female element of the grinding mechanism. A cylindrical rim 61 is formed at the bottom edge of the body 11 extending downwardly from the lower edge of the conical face 13.

Figure 4:
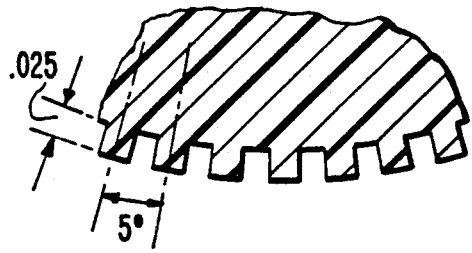
FIG. 4 is an enlarged sectional view showing the grooves on the male grinding element of the peppermill taken along the line 4—4 of FIG. 3.
Figure 5:
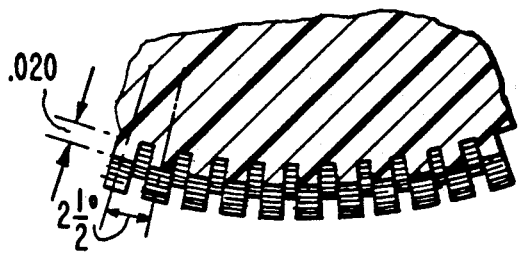
FIG. 5 is an enlarged sectional view showing the grooves on the male grinding element of the peppermill of FIG. 5 taken along the line 5—5 in FIG. 3.

Coacting with the female element of the grinding mechanism is the male element 15 formed in a stepped configuration in the shape of a wedding cake. The male grinding element is formed into four tiers 71 through 74, the bottom tier 71 being conical to mate with the inwardly facing conical face 13 of the body 11. The tiers 72 through 74 are generally cylindrical and the outer cylindrical surfaces of all of the tiers 72-74 are provided with vertical grooves. As shown in FIG. 4, the vertical grooves in the tiers 72-74 are at 5 degree intervals around the axis of the grinding element and are 0.025 inches deep. Grooves are provided in the conical surface of the conical tier 71 at 2½ degree intervals as shown in FIG. 5 and are 0.020 inches deep.

Figure 6:
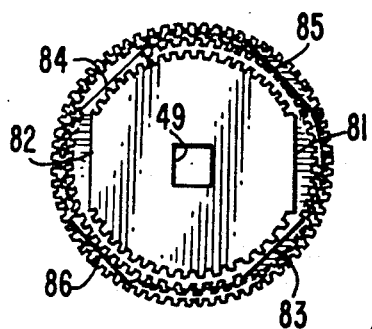
FIG. 6 is a top plan view of the male grinding element of the peppermill.
Figure 3:
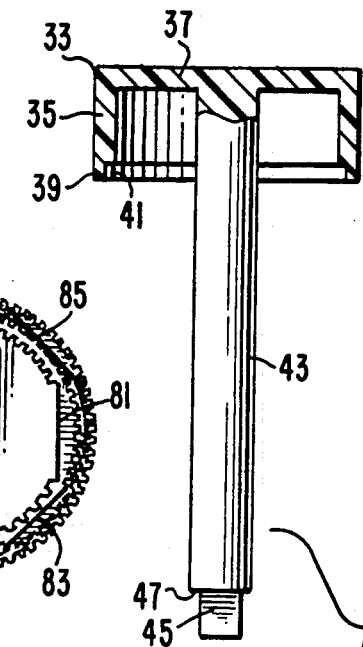
FIG. 3 is an exploded view of the components of the peppermill prior to assembly.

The upper three tiers 72 through 74 are each provided with two flats as best shown in FIG. 6. The flats 81 and 82 on the tier 74 are on opposite sides of the axis of the male element. The flats 83 and 84 on the tier 73 are on opposite sides from each other relative to the axis and are displaced from the flats on the tier 74 by angles of 45 degrees. The flats 85 and 86 on the tier 72 are displaced from the flats 81 and 82 by 90 degrees. All of the flats 81 through 86 are 1/16 of an inch deep at their centers measured from the cylindrical locus of the outer surface of the corresponding tier.

The outside diameter of the upper tier 74 is sized so it leaves a space of about 5/32 of an inch between the outer diameter of the upper tier 74 and the inner diameter of the body 11 which in the preferred embodiment has an inner diameter of 1.610 inches. The tier 73 has an outer diameter ⅛ of an inch larger than the tier 74 and the tier 72 has a diameter ⅛ of an inch larger than the tier 73. The top of the conical tier 71 is flush with the cylindrical surface of the tier 72 and slopes to an outer diameter of 1.690 inches at the bottom, which corresponds to the inner diameter of the rim 61. The space between the outer diameter of the tier 74 and the inner diameter of the body 11 is selected so that most of the peppercorns will be a little too large to fit into this space. The peppercorns will fall into the larger space between the flats 81 and 82 and the inner surface of the body 11.

A portion 29 at the upper end of the cylindrical body 11 is reduced in outside diameter by having the wall thickness of the cylindrical body reduced from 0.070 inches to 0.035 inches. The reduced diameter portion 29 defines at the lower edge thereof an upwardly facing step 31 in the form of a circular planar surface perpendicular to the axis of the cylindrical body. A cylindrical knob 33 is shaped to fit with the reduced diameter portion 29. The knob 33 has a cylindrical outer wall 35, a top wall 37 and an open bottom to define a hollow interior within the knob 33. The bottom edge of the cylindrical wall 35 has a portion 39 with an increased inner diameter to define an internal step 41 in the form of a planar circular surface perpendicular to the axis of the cylindrical side wall 35. The interior cylindrical surface of the portion 39 makes a sliding fit with the external cylindrical surface of the reduced diameter portion 29 of the cylindrical body 11. When the knob 33 is placed on the cylindrical body portion, the step 41 abuts against the step 31.

A connecting rod 43 extending through the body 11 is fixed to the knob 33 at one end and is fixed at the other end to the male grinding element 15 so that by turning the knob 33, the male grinding element 15 is rotated within the female grinding element defined by the tapered end face and grooves on the lower end of the body 11. In the preferred embodiment, the connecting rod 43, the knob 33, and the male grinding element 15 are permanently fixed together with the body 11 filled with peppercorns. This means that the assembled grinder filled with peppercorns cannot be disassembled to refill the grinder. In the illustrated embodiment, the connecting rod 43 and the knob 33 are molded in a one-piece construction. To assemble the completed unit, the one-piece knob 33 and connecting rod 43 combination is placed on the upper end of the cylindrical body and the entire assembly is inverted so that knob 33 is at the bottom. The assembled two pieces are then filled with peppercorns. Next, the male grinding element is positioned in the female grinding element and affixed to the connecting rod 43.

The bottom end 45 of the connecting rod 43 is provided with a square shape in cross section and is reduced in size from the cross sectional area of the upper part of the connecting rod 43 so as to define a downwardly facing step 47. The top wall of the male grinding element 15 is provided with a rectangular aperture 49 which fits with the bottom end 45 of the connecting rod 43. During the assembly, after the knob 33 has been assembled with the body 11 and filled with peppercorns while inverted, the male grinding element 15 is positioned on the connecting rod 43. At this time the tip of the end section 45 will be projecting through the aperture 49 and into a cavity 25 formed in the bottom of the male grinding element 15. Heat is then applied to this projecting tip to melt the material thereof and cause it to enlarge and resolidify into a flange 51 with a cross sectional area larger than the cross sectional area of the rectangular aperture 49 so that the connecting rod 43 is affixed to the male grinding element 15.

When the male grinding element 15, is assembled with the connecting rod 43, the conical face of the tier 71 will engage and make a sliding fit with the conical face 13. This engagement between these conical faces stops the male grinding element 15 from being drawn into and through the body 11 such as by lifting on the knob 33.

It will be apparent that with the components of the grinder assembled as shown in the drawings, they cannot be disassembled without breaking or cutting the unit apart, such as for example, cutting or breaking off the flange 51, to refill the unit with peppercorns. This is not a disadvantage in the preferred embodiment of the grinder since it is intended to be disposed of after it has been emptied. Thus, this technique of assembly resulting a permanently assembled structure can be used instead of a structure which would permit the components to be disassembled for refilling the grinder with peppercorns. Instead of affixing the connecting rod to the male grinding element by enlarging its tip into a flange, it may be affixed by cementing or by a frictional fit in the aperture 49.

Figure 2:
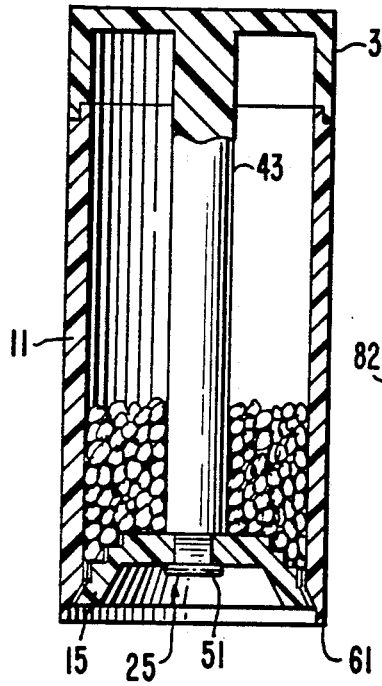
FIG. 2 is a partial axial sectional view of the peppermill of FIG. 1 taken along the line 2—2 of FIG. 1.

To use the grinder, the knob 33 is turned with the grinder oriented as shown in FIGS. 1 and 2, that is with the male and female grinding elements beneath the contained peppercorns. Gravity will feed the peppercorns into the space between the male grinding element 15 and the grooved cylindrical section 14 of the female grinding element, that is into the spaces between the flats 81 and 82 and the grooved cylindrical section 14. As the male grinding element is turned, the peppercorns are shoved against the grooves of the female grinder by the turning action of the male grinding element and the peppercorns become squeezed between the male and female grinding elements crushing the squeezed peppercorns.

The whole peppercorns will first be crushed between the tier 74 and the grooved section 14 on the inner surface of the body 11. This will break the peppercorns into smaller pieces which will fall into the smaller space between the tier 73 and the grooved section 14 where they will be broken into still smaller pieces to fall between the tier 72 and the section 14. These pieces are then ground into still smaller pieces so as to enter between the conical surface on the tier 71 and the conical face 13 where the particles are ground into the size to be discharged from the grinder. The four tier arrangement of the male grinding element thus provides an efficient structure for grinding the peppercorns into progressively smaller particles.

The coarseness of the ground pepper will depend upon the spacing between the male grinding element and the female grinding element. For fine ground pepper, the conical surface of the male grinding element 15 will be in sliding contact with the conical end face 13 and the ground pepper will be ejected through the grooves in the conical end face 13 and in the conical surface on the grinding element 15. For coarser ground pepper, the conical surfaces are arranged to be slightly spaced from one another. A medium grind is achieved with a spacing of about 0.005 inches measured axially between the two conical surfaces. If the male grinding element abuts the step 47 on the connecting rod 43, the clearance between the two conical surfaces can be determined by the axial distance between the step 41 and the step 47 compared to the length of the body 11. For example, if an axial dimension of 4 inches between the step 41 and the step 47 results in a grinder with the conical surfaces of the grinding elements in sliding contact with one another, then by increasing the axial dimension between the step 41 and the step 47 to 4.005 inches a medium grind will be effected. The 0.005 inches clearance will allow the cap connecting rod and male grinding element to move axially in the body 11 by this amount. However, when the user works the grinder, he will exert a downward pressure on the knob 33 to maintain the 0.005 inches clearance while the peppercorns are being ground.

The purpose of the rim 61 is to provide a space between the grinder orifice and a surface on which the grinder might be placed in an upright position. Thus, if the grinder is placed on a wet surface, moisture from the surface will not come into contact with the discharge orifice of the grinding surfaces. Also by having the lower edge of the conical face terminate inside of the outside diameter of the body 31, a sharp edge at the bottom of the grinder is avoided. A sharp edge would be undesirable as it could injure the user, and it would be subject to chipping or cracking.

Instead of molding the connecting rod in one piece with the turning knob 33, the connecting rod may be molded in one piece with the male grinding element. In this case, the assembly of the connecting rod and male grinding element is inserted into the body 11 with the grooved conical face on the lower end of the body 11 in engagement with the conical surface of the male grinding element. Then after filling the assembly with peppercorns, the connecting rod is fixed to the turning knob 33 in a manner similar to the procedure employed for affixing the connecting rod is affixed to the male grinding element described above for the illustrated embodiments.

Also, the grinder may be modified to make the grinder refillable instead of disposable. For a refillable embodiment, the end of the connecting rod is formed into a cylindrical screw and the male member 15 is provided with a threaded aperture and screwed on the connecting rod 43. To refill the pepper grinder, the the male grinding element is unscrewed from the connecting rod to open the body 11 for refilling. In a similar manner, the embodiments in which the connecting rod is molded in one piece with the male grinding element may also be modified to be refillable.

The grinder of the invention is particularly designed for grinding peppercorns. However, it will be apparent that the grinder is applicable for grinding other foods which can be ground by crushing and in which the resulting particulate manner from the crushing remains nonsticky and will not clog the grinding mechanism. For example, the grinder can be used to grind salt, hard cheese, or nuts.

Because the grinder of the invention is made simply of only three pieces which can be assembled into a filled pepper grinder by a very simple process subject to automation which is as easy if not easier than the process of filling present day containers of peppercorns, the assembled package of the disposable pepper grinder containing the peppercorns to be ground can be provided as competitively as the peppercorns as presently packaged in jar like containers and the pepper grinder of the present invention can be simply thrown away after dispensing the contained peppercorns without additional cost to the consumer. As a result, the nuisance and disadvantage of having to refill the pepper grinder and maintaining a supply of peppercorns for refilling the grinder is eliminated.

The above description is of a preferred embodiment of the invention and many modifications, in addition to those described above, may be made thereto without departing from the spirit and scope of the invention, which is defined in the appended claims.

What is claimed is:

1. A food grinder comprising a hollow cylinder, means defining a female grinding element on one end of said hollow cylinder, a male grinding element positioned within said female grinding element, said male grinding element and female grinding element comprising means to grind food contained within said cylinder when said male element is turned within said female element, a knob rotatably mounted on the other end of said cylinder, a connecting rod connecting said male grinding element with said knob and comprising means to turn said male grinding element when said knob is rotated on said cylinder, said connecting rod being molded in one piece with said knob.

2. A food grinder as recited in claim 1, wherein said knob, said connecting rod, and said male grinding element are permanently fixed together.

3. A food grinder as recited in claim 1, wherein said connecting rod is permanently fixed to said male element.

4. A food grinder comprising means defining an inwardly facing cylindrical surface, axial grooves extending along said cylindrical surface, a male grinding element rotatable within said cylindrical surface, said male grinding element comprising a plurality of tiers distributed axially in said grinding element, each tier having generally circular surface portions with radially extending teeth distributed along said circular surface portions and each tier having at least one flat surface portion extending between circular portions of the corresponding tier, the circular portion of each lower one of said tiers having a greater diameter than the circular portions of an adjacent upper one of said tiers.

* * * * *